United States Patent [19]

Elsholz

[11] Patent Number: 4,459,145
[45] Date of Patent: Jul. 10, 1984

[54] FABRICATION OF GLASS MICROSPHERES WITH CONDUCTING SURFACES

[75] Inventor: William E. Elsholz, Acampo, Calif.

[73] Assignee: The United States of America as represented by the United States Department of Energy, Washington, D.C.

[21] Appl. No.: 429,924

[22] Filed: Sep. 30, 1982

[51] Int. Cl.$^3$ .................... C03B 19/10; C03C 17/09
[52] U.S. Cl. ..................................... 65/21.3; 65/21.4; 65/22; 65/60.51; 65/60.7; 427/251; 427/252; 427/253
[58] Field of Search ............... 65/21.3, 22, 21.4, 60.7, 65/60.51; 427/251, 252, 253

[56] References Cited

U.S. PATENT DOCUMENTS

| | | | |
|---|---|---|---|
| 2,730,841 | 1/1956 | Searight | 65/21.3 |
| 3,231,408 | 1/1966 | Ulfketel | |
| 3,429,295 | 2/1969 | Shapiro | 118/49.1 |
| 3,471,314 | 10/1969 | Beatty et al. | |
| 3,623,854 | 11/1971 | Frank | 65/60.7 X |
| 3,713,884 | 1/1973 | Maley | |
| 3,827,870 | 8/1974 | Fogelberg et al. | 65/60.7 |
| 3,920,433 | 11/1975 | Fogelberg et al. | 427/253 X |
| 4,021,253 | 5/1977 | Budrick et al. | 106/53 |
| 4,133,854 | 1/1979 | Hendricks | 264/10 |
| 4,163,637 | 8/1979 | Hendricks | 425/6 |
| 4,257,798 | 3/1981 | Hendricks et al. | 65/21.4 |
| 4,257,799 | 3/1981 | Rosencwaig et al. | 65/21.4 |
| 4,316,786 | 2/1982 | Yu et al. | 204/20 |
| 4,321,073 | 3/1982 | Blair | 427/252 X |

FOREIGN PATENT DOCUMENTS

| | | | |
|---|---|---|---|
| 2548446 | 5/1976 | Fed. Rep. of Germany | |
| 53-5328 | 2/1978 | Japan | 65/21.4 |
| 607809 | 5/1978 | U.S.S.R. | |
| 0812780 | 3/1981 | U.S.S.R. | 65/21.4 |

Primary Examiner—Robert L. Lindsay, Jr.
Attorney, Agent, or Firm—Henry P. Sartorio; L. E. Carnahan; Michael F. Esposito

[57] ABSTRACT

A method for making hollow glass microspheres with conducting surfaces by adding a conducting vapor to a region of the glass fabrication furnace. As droplets or particles of glass forming material pass through multiple zones of different temperature in a glass fabrication furnace, and are transformed into hollow glass microspheres, the microspheres pass through a region of conducting vapor, forming a conducting coating on the surface of the microspheres.

14 Claims, 1 Drawing Figure

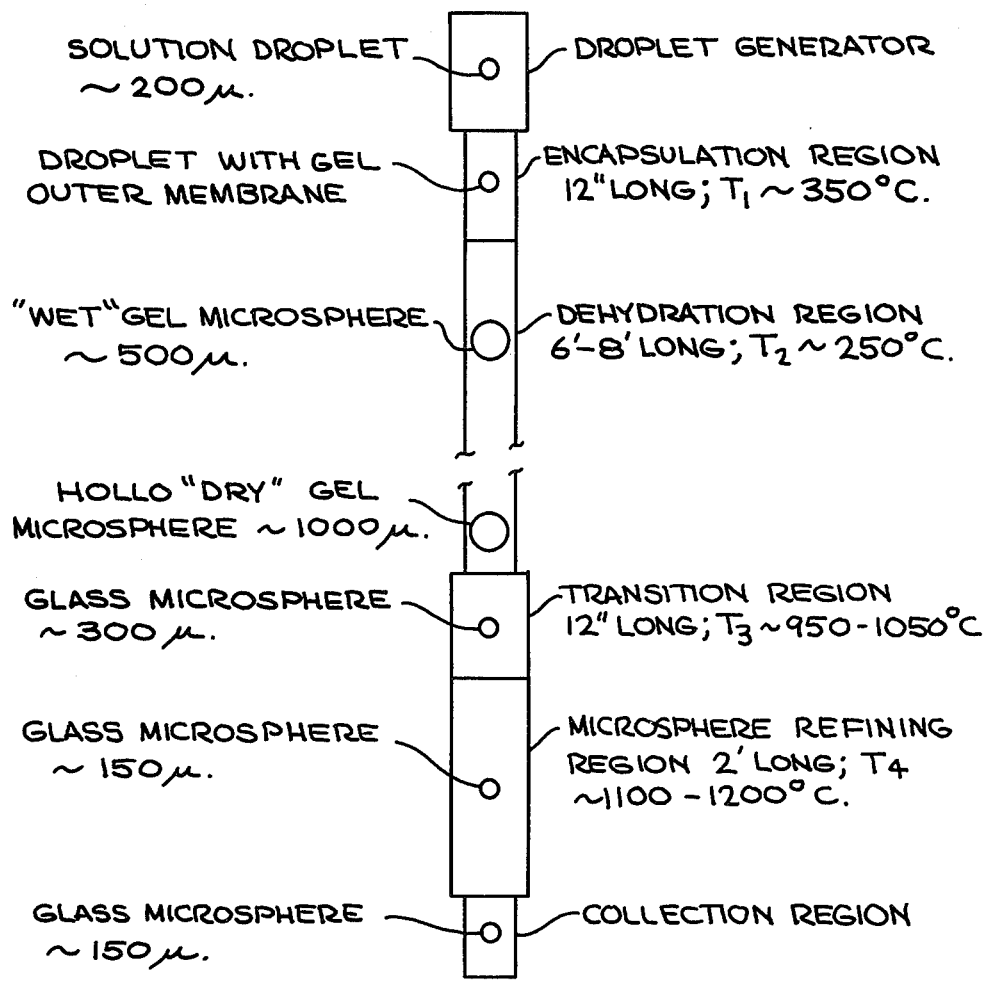

FABRICATION OF GLASS MICROSPHERES WITH CONDUCTING SURFACES

BACKGROUND OF THE INVENTION

The U.S. Government has rights in this invention pursuant to Contract No. W-7405-ENG-48 between the U.S. Department of Energy and the University of California.

The invention relates to the production of small glass microspheres and, more particularly, to the fabrication of glass microspheres with conducting surfaces.

Because fossil fuels are nonrenewable and supply shortages pose a serious threat, both economic and political, other methods of producing energy are being actively investigated, including fusion processes. Inertial confinement fusion, including laser fusion, is a process in which a small fuel capsule is imploded by a laser beam or particle beam to produce a fusion reaction of the fuel. Initial laser fusion experiments were performed with simple targets comprising hollow glass microspheres on the order of 100 microns in diameter filled with a deuterium tritium fuel mixture. The glass microspheres require a high degree of sphericity, concentricity and surface smoothness. The results demonstrated that a fusion reaction could be produced.

A liquid droplet method and apparatus for producing small hollow spheres utilizing a multi-zone oven is described in U.S. Pat. Nos. 4,133,854 and 4,163,637 to Hendricks issued Jan. 9, 1979 and Aug. 7, 1979, respectively. An improvement on the method is described in U.S. Pat. No. 4,257,799 to Rosencwaig, et al. issued Mar. 24, 1981. In these methods a liquid droplet of glass forming material is dropped through a vertical multi-zone furnace to produce glass shells. As shown in U.S. Pat. No. 4,257,798 to Hendricks, et al. issued Mar. 24, 1981 the spheres can be filled with a gas while in the oven during the formation process. In addition to the liquid droplet method the dried gel method can also be utilized to produce small glass microspheres. A dried gel frit of glass forming material is introduced into a vertical multi-zone furnace similar to that described in the above referenced patents. An example of a glass frit is shown in U.S. Pat. No. 4,021,253 to Budrick, et al. issued May 3, 1977.

More complex targets than the simple fuel filled glass shell are required in order to reach scientific breakeven, in which the energy obtained from the process equals the energy required to initiate the process. Advanced target designs require multiple shells of a variety of materials. Considerable work is being done on producing a variety of coatings, both of polymeric materials and metal coatings, on small spherical shells, particularly in the 50-500 micron diameter range. The targets and the individual layers therein must meet the requirements for sphericity, concentricity and surface smoothness. Several methods being investigated are electroplating, electroless plating, chemical vapor deposition and physical vapor deposition techniques. One apparatus for electroplating small microspheres is shown in U.S. Pat. No. 4,316,786 to Yu, et al. issued Feb. 23, 1982. In order to carry out the electroplating process a conductive work piece is required. Therefore an initial conductive surface or strike must first be placed on the glass shell. The strike can be produced by sputtering a layer of platinum on the surface of the nonconducting glass sphere or by the deposition of silver on the sphere from an ammonia silver nitrate solution. However, if the strike does not adhere well to the glass microsphere the electroplated coating produced thereon will lack the very high sphericity, concentricity and surface smoothness required for fusion targets. Accordingly, for the development of fusion targets with metal coatings it is desirable to produce a glass microsphere having a conducting surface.

German Offenlegungsschrift No. 25 48 446 shows a carbon microsphere containing nuclear fusion fuel coated with a metallic layer, preferably palladium, produced by such methods as vacuum evaporation, sputtering or nonelectrolytic deposition.

U.S. Pat. No. 3,429,295 to Shapiro issued Sept. 17, 1963 shows apparatus for producing vapor coated fissile particles utilizing a centrifugal carrier apparatus. U.S. Pat. No. 3,471,314 to Beatty, et al. issued Oct. 7, 1969 shows a pyrolytic carbon coating process for nuclear fuel particles utilizing a fluidized bed. U.S. Pat. No. 3,231,408 to Huddle issued Jan. 25, 1966 shows a method of coating nuclear fuel materials with carbon.

In the glass industry, already fabricated glass surfaces are plated with a metal coating such as tin prior to electroplating. A sheet of glass is placed in an oven, heated and sprayed with a hot vapor mist such as stannic chloride ($SnCl_4$). Russian Patent (11) No. 607,809 to Barabolkina, et al., published May 25, 1978 shows a method of applying a stannic oxide film to glass. U.S. Pat. No. 3,713,884 to Maley issued Jan. 30, 1973 shows a method for preparing a conductive coating on a glass surface such as an electron tube glass envelope by coating the surface with an aqueous solution of stannous chloride and heating the coated glass.

It is an object of the invention to provide hollow glass microspheres with conducting surfaces for use as laser fusion targets.

It is also an object of the invention to produce the conducting surface on the glass microsphere during the microsphere fabrication process. It is another object of the invention to produce a glass microsphere with a conducting surface which can be utilized in an electroplating process for producing an additional metal coating thereon.

SUMMARY OF THE INVENTION

The invention is a method for making glass microspheres with conducting surfaces in a glass fabrication furnace during the microsphere fabrication process. The glass microspheres are made by the liquid droplet or dried gel processes in vertical multi-zone ovens. As the liquid droplets or dried gel frits drop through successive regions of various preselected temperatures microshells are formed. According to the invention a conducting vapor in mist form, e.g. stannic chloride ($SnCl_4$) for tin coatings, is added to a region of the glass fabrication furnace, generally to one of the final (high temperature) zones where the glass forming material has already been formed into glass. As the microsphere drops through the region of coating vapor during the fabrication process a conducting coating forms on the microsphere.

The invention provides a microsphere with a conducting surface which meets the specifications of sphericity, concentricity and surface smoothness required for fusion targets. By falling through a column of coating vapor, a uniform coating is produced on the microspheres. The high temperature of the microspheres inhibits any back reactions. The method can be used to provide a variety of conducting coatings, for example tin and platinum. The method can easily be adapted to an automated mass production process since the coating step forms an integral part of the basic glass microsphere fabrication process. By producing coated microspheres as part of the glass fabrication process itself the necessity and difficulty of coating manufactured spheres in a separate process is eliminated.

BRIEF DESCRIPTION OF THE DRAWINGS

The FIGURE is a schematic illustration of an embodiment of a vertical drop furnace for the production of glass microspheres.

DETAILED DESCRIPTION OF THE PREFERRED EMBODIMENTS

The invention is an improvement on the methods of producing small hollow spheres, as described in the above-referenced U.S. Pat. Nos. 4,133,854, 4,163,637, and 4,257,799, for producing microspheres with conducting surfaces. The methods and apparatus for producing hollow microspheres in general are described in the above-referenced U.S. Pat. Nos. 4,133,854, 4,163,637 and 4,257,799 which are herein incorporated by reference. The basic apparatus for the production of glass microspheres is a multi-zoned oven, generally having three or four regions having specific lengths and temperatures in each region. By controlling the temperature and transit time through each region of the oven it is possible to control the diameter and wall thicknesses of the resultant microspheres. Typical diameters are 50–500 microns with shell thicknesses of 0.5–20 microns. Liquid droplets or dried gel frits of glass forming material are dropped through the vertical multi-zone oven. By passing through the different zones at various preselected temperatures for preselected transit times, the glass forming material is transformed into glass microspheres by processes as described in the above-referenced patents. The invention comprises placing a conducting vapor in at least one region of the vertical drop furnace so that the glass microspheres pass through an environment of conducting vapor and a conducting coating forms on the surface of the microsphere.

An example of carrying out the method according to the invention is illustrated with reference to the FIGURE. The vertical drop furnace is composed of four distinct sections. The topmost insertion section comprises a droplet generator for introducing liquid droplets of glass forming material. Below that is the relatively low temperature drying section, typically made up of two separate regions, an encapsulation region and a dehydration region. The encapsulation region typically operates at a temperature in the range of 300°–400° C. and has a length of 0.5–2 feet, while the dehydration region has a temperature in the range of 200°–300° C. and a length of 4–8 feet. Alternatively, the drying region can comprise a single region at a temperature of 200°–300° C. with an increased length of 2–4 feet to provide sufficient time for the process to be carried out at the lower temperature. Below the drying section is the fusing section, which is generally made up of a transition region and refining region. The transition region is 0.5–1 foot long and has a temperature of 900°–1200° C. while the refining region is 1–3 feet at 1100°–1500° C. At the bottom is the collector section where the glass microspheres are collected, and furnace gases are drawn out through a vacuum vent. The individual regions are separately heated, the furnace is well sealed and insulated and the amount of air drawn into the furnace is carefully controlled by means of a vacuum vent in the collector section. The furnace operates either under vacuum conditions or at ambient atmospheric pressure or under pressurized conditions if required. The lengths of the various regions are selected to provide the necessary transit times for the transformation of the glass forming material into microspheres while the temperatures are selected to produce the necessary chemical reactions or transformations of the various steps of the process.

In the liquid droplet fabrication method as is illustrated in the FIGURE, a gel membrane is formed on the liquid droplet and a dry gel microsphere is formed in the drying region of the furnace. In the high temperature transition region the gel microsphere is transformed into glass, while in the refining region the glass microsphere is further treated to improve the quality.

Alternatively, using similar apparatus, the dried gel method may be used in place of the liquid droplet method for fabricating microspheres. The dried gel method provides greater sizes and wider range of compositions. Dried gel frits of glass forming material are introduced into a vertical furnace by a particle injector. A multi-zoned furnace similar to that illustrated in the FIGURE for the liquid droplet method is utilized, although frequently the drying section is eliminated since the dried gel frits contain only water of hydration so there are fewer steps in the glass formation process. The water of hydration in the gel is encapsulated and the particles blow and fuse into hollow glass shells. The length and temperature of the furnace controls the quality of the microspheres. A long, high temperature refining zone is generally utilized.

According to the invention glass microspheres with conducting surfaces are produced using apparatus as previously described by introducing a conducting vapor in mist form into a region of the glass fabrication furnace, generally to one of the final (high temperature) zones. By introducing the conducting vapor into the transition or refining region of the furnace where the glass forming material has already been formed into a glass shell, a conducting coating forms on the surface of the shell. Stannic chloride $SnCl_4$ is utilized to produce tin coatings. The introduction of a conducting vapor into a region of the furnace itself so that the glass microspheres pass through a coating environment during the fabrication process produces a very smooth uniform coating on a high quality microsphere. The high temperatures in the fabrication furnace inhibit back reactions of the material, and undesirable elements in the coating vapor can easily be removed.

The method of producing microspheres with conductive coatings according to the invention has been described with reference to a particular embodiment of a multiple zone oven for illustrative purposes but can be carried out with a variety of oven configurations. The invention can also be carried out as a series of separate steps in which glass microspheres are first produced in one apparatus, e.g., a multizone drop furnace using either the liquid droplet or dried gel method. The microspheres can then be transferred to a separate coating column, e.g., a two zone drop furnace in which the microspheres are heated in the top section and then pass through an atmosphere of conducting vapors in the bottom section where a conducting surface is placed on the microspheres before the finished microspheres are collected.

If the conducting vapor is added to an upper region (low temperature) of a vertical multizone fabrication oven, at a stage before the glass forming material has fused into glass, the conducting vapor permeates into the glass forming material and produces a doped or seeded glass. Since the conducting vapor is carried through the oven to the vent at the bottom, the lower (high temperature) regions of the oven will also contain a conducting atmosphere which contacts the microspheres after the glass has fused, and thereby also produces a conductive coating on the microsphere.

The invention is carried out by vaporizing a solution of the conductive coating material and using a carrier gas to inject the vapor into a region of the oven. Generally, solutions of chlorides of various metals, including tin, platinum, copper, and gold, can be utilized. One particular solution utilized was:

50 ml Methyl Alcohol
25 ml Acetic Acid
0.3 g Ammonium Sulfate
60.0 g Sn $Cl_4$-$5H_2O$ (crystal)
15.5 ml $H_2O$ Another solution utilized was 5 g. Anhydrous $SnCl_4$ in 1 ml $H_2O$.

The solution of coating material is introduced into the oven through an access port using a carrier gas, e.g., Ar, $N_2$, $CO_2$. An atomizer can be utilized to introduce the conducting vapor in bursts, or a continuous flow gun in which a chamber containing the solution is connected to a stream of carrier gas which flows into the oven. The solution is heated to vaporize the solution as the carrier gas picks up conducting vapor. Alternatively, the carrier gas can flow through a heated bubble flask containing the solution.

In an illustrative operational configuration, the coating column is at atmospheric pressure and at a temperature of 650° C. The outlet gas flow is about 23 atm cc/min. The carrier gas with conducting vapor is introduced at 5-15 psi. Considerable variation in the operational parameters are possible. Temperatures of 375° C. can be utilized, however, the best results are obtained at higher temperatures, preferably around 650° C.

Coating thicknesses from 150A to 1 $\mu$ and conductivities of from 100 $\Omega$/sq cm to 1000 $\Omega$/sq cm have been produced. The coated microspheres are characterized by two methods: Auger Analysis for material composition and Scanning Electron Microscope (SEM) for surface quality. Some specific examples of coatings produced are:

EXAMPLE 1

A tin coating of 1 $\mu$ thickness was produced in a 54" long coating oven at 600° C.

EXAMPLE 2

A tin coating of 300 nm was produced in a 48" column at 525° C. with a carrier gas at 6 psi.

EXAMPLE 3

A tin coating of 500A was produced on a microsphere having 70 $\mu$ ID×3 $\mu$ wall thickness.

I claim:

1. A method for fabricating hollow glass microspheres with conducting surfaces comprising;
   dropping liquid droplets or dried gel frits of glass forming material through a glass forming vertical oven having multiple regions of preselected temperature and length to form hollow glass microspheres; and
   introducing a mist of conducting vapor into at least one region of the oven where the glass forming material has fused into glass to produce an atmosphere of conducting vapor through which the microspheres pass during the fabrication process to produce a conducting coating on the microspheres as part of the microsphere fabrication process.

2. The method of claim 1 wherein the vertical oven includes a high temperature fusing region where the glass forming material is transformed into glass microspheres.

3. The method of claim 2 wherein the fusing region includes a transition region where the glass forming material is transformed into glass microspheres and a refining region where the glass microspheres are further refined.

4. The method of claim 2 wherein the conducting vapor is introduced into the fusing region.

5. The method of claim 3 wherein the conducting vapor is introduced into at least one of the transition region and the refining region.

6. The method of claim 1 wherein the conducting vapor is a solution of a chloride of a metal selected from Tin, Platinum, Copper and Gold.

7. The method of claim 6 wherein the chloride solution is introduced in the oven by means of a carrier gas.

8. The method of claim 7 wherein the carrier gas is selected from Argon, Nitrogen and Carbon Dioxide.

9. The method of claim 7 wherein the carrier gas with conducting vapor is introduced into the oven at 5-15 psi.

10. The method of claim 6 wherein the conducting vapor is formed by vaporizing a solution of 60 g $SnCl_4$-$5H_2O$, 0.3 g, Ammonium Sulfate, 50 ml Methyl Alcohol, 25 ml Acetic Acid, and 15.5 ml water.

11. The method of claim 6 wherein the conducting vapor is formed by vaporizing a solution of 5 g anhydrous $SnCl_4$ in 1 ml water.

12. The method of claim 6 wherein the chloride solution is introduced into the oven by atomizing the solution.

13. The method of claim 1 wherein the conducting vapor is introduced in a region of the oven which is maintained at a temperature of at least about 375° C.

14. The method of claim 1 wherein the conducting vapor is introduced in a region of the oven which is maintained at a temperature of about 650° C. or higher.

* * * * *